United States Patent
Jackson et al.

(10) Patent No.: US 9,676,283 B2
(45) Date of Patent: Jun. 13, 2017

(54) METHOD AND SYSTEM FOR PRE-COOLING TRACTION BATTERY IN ANTICIPATION OF RECHARGING AT CHARGING STATION

(71) Applicant: Ford Global Technologies, LLC, Dearborn, MI (US)

(72) Inventors: Kenneth J. Jackson, Dearborn, MI (US); Raymond C. Siciak, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 14/535,394

(22) Filed: Nov. 7, 2014

(65) Prior Publication Data

US 2016/0129797 A1 May 12, 2016

(51) Int. Cl.
*H02J 7/00* (2006.01)
*B60L 11/18* (2006.01)

(52) U.S. Cl.
CPC ....... *B60L 11/1816* (2013.01); *Y02T 10/7005* (2013.01)

(58) Field of Classification Search
CPC ............ B60H 1/00428; B60L 11/1816; B60L 11/1887; B60L 1/003; B60L 1/02; Y02T 10/70; Y02T 10/7072; Y02T 10/7077; Y02T 90/14
See application file for complete search history.

(56) References Cited

U.S. PATENT DOCUMENTS

| | | | |
|---|---|---|---|
| 2008/0179040 A1 | 7/2008 | Rosenbaum | |
| 2008/0180058 A1* | 7/2008 | Patel | B60H 1/00428 320/109 |
| 2012/0025762 A1* | 2/2012 | Lienkamp | B60L 3/0046 320/109 |
| 2012/0158227 A1* | 6/2012 | Tate, Jr. | B60K 6/46 701/22 |
| 2013/0241490 A1* | 9/2013 | Kim | H01M 10/443 320/112 |
| 2014/0012447 A1 | 1/2014 | Gao et al. | |
| 2014/0326430 A1* | 11/2014 | Carpenter | B60L 11/1874 165/41 |
| 2014/0338376 A1* | 11/2014 | Carpenter | B60L 1/003 62/115 |
| 2015/0054460 A1* | 2/2015 | Epstein | B60L 11/187 320/109 |

* cited by examiner

*Primary Examiner* — Vuthe Siek
(74) *Attorney, Agent, or Firm* — David B. Kelley; Brooks Kushman P.C.

(57) ABSTRACT

Methods and systems for electric vehicles, such as a battery electric vehicle (BEV) and a plug-in hybrid electric vehicle (PHEV), include pre-cooling a traction battery of the vehicle upon an indication that the vehicle is being driven to a charging station. The pre-cooling is done by an on-board battery cooling system. The pre-cooling depends on the distance between the vehicle and the charging station.

14 Claims, 2 Drawing Sheets

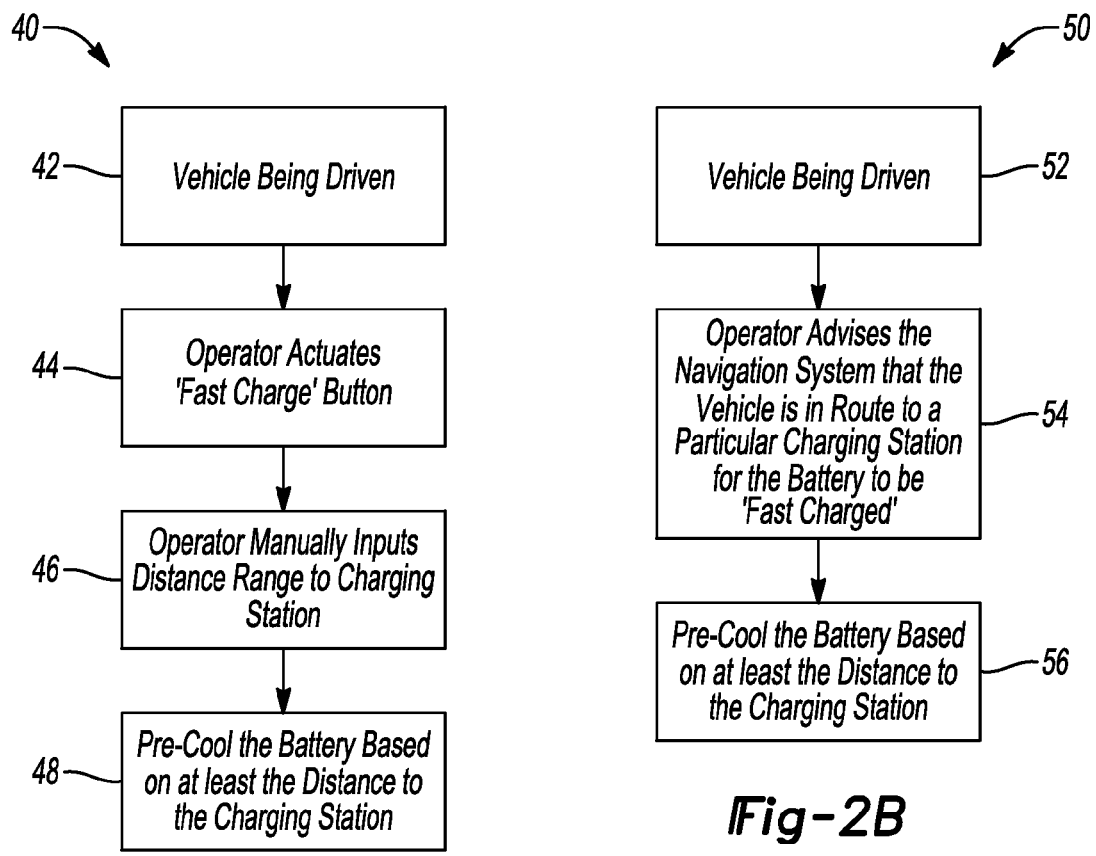

METHOD AND SYSTEM FOR PRE-COOLING TRACTION BATTERY IN ANTICIPATION OF RECHARGING AT CHARGING STATION

TECHNICAL FIELD

This disclosure relates to cooling a traction battery of an electric vehicle.

BACKGROUND

An electric vehicle includes a traction battery and an electric motor. The motor converts electrical energy from the battery into a motor torque for vehicle propulsion.

The traction battery of a battery electric vehicle (BEV) or a plug-in hybrid electric vehicle (PHEV) is rechargeable with energy from the electric grid. Recharging a battery may be done at various rates. For example, "DC fast charge" is a recharging process which uses high voltage and high current to reduce charging time and thereby replenish the battery relatively quickly. A battery may also be recharged with normal line current, through inductive charging, or by other methods.

Regardless of the method, recharging generates heat that may raise the battery temperature. It is may thus be desirable to pre-cool the battery in anticipation of recharging to maintain the battery temperature within a desirable limit.

SUMMARY

In an embodiment, a method for an electric vehicle such as a plug-in hybrid vehicle (PHEV) and a battery electric vehicle (BEV) is provided. The method includes pre-cooling a traction battery of the vehicle upon an indication that the vehicle is being driven to a charging station. The pre-cooling may be adjusted depending on a distance between the vehicle and the charging station. The pre-cooling may be also be adjusted depending on a rate of recharging, a temperature of the battery relative to a pre-defined maximum battery temperature threshold, and/or a state of charge of the battery.

In an embodiment, a system for an electric vehicle is provided. The system includes a battery cooling system and a controller. The battery cooling system is configured to cool a traction battery of the vehicle. The controller is configured to control the battery cooling system to pre-cool the battery upon an indication that the vehicle is being driven to a charging station.

In an embodiment, a vehicle having a traction battery and a battery cooling system is provided. The battery cooling system is configured to pre-cool the battery upon an indication that the vehicle is being driven to a charging station.

BRIEF DESCRIPTION OF THE DRAWINGS

FIGS. 2A and 2B illustrate flowcharts describing respective operations of pre-cooling the traction battery of the vehicle, while the vehicle is being driven, in anticipation of recharging the battery at a charge station in accordance with embodiments of the present invention.

DETAILED DESCRIPTION

Figure 1:
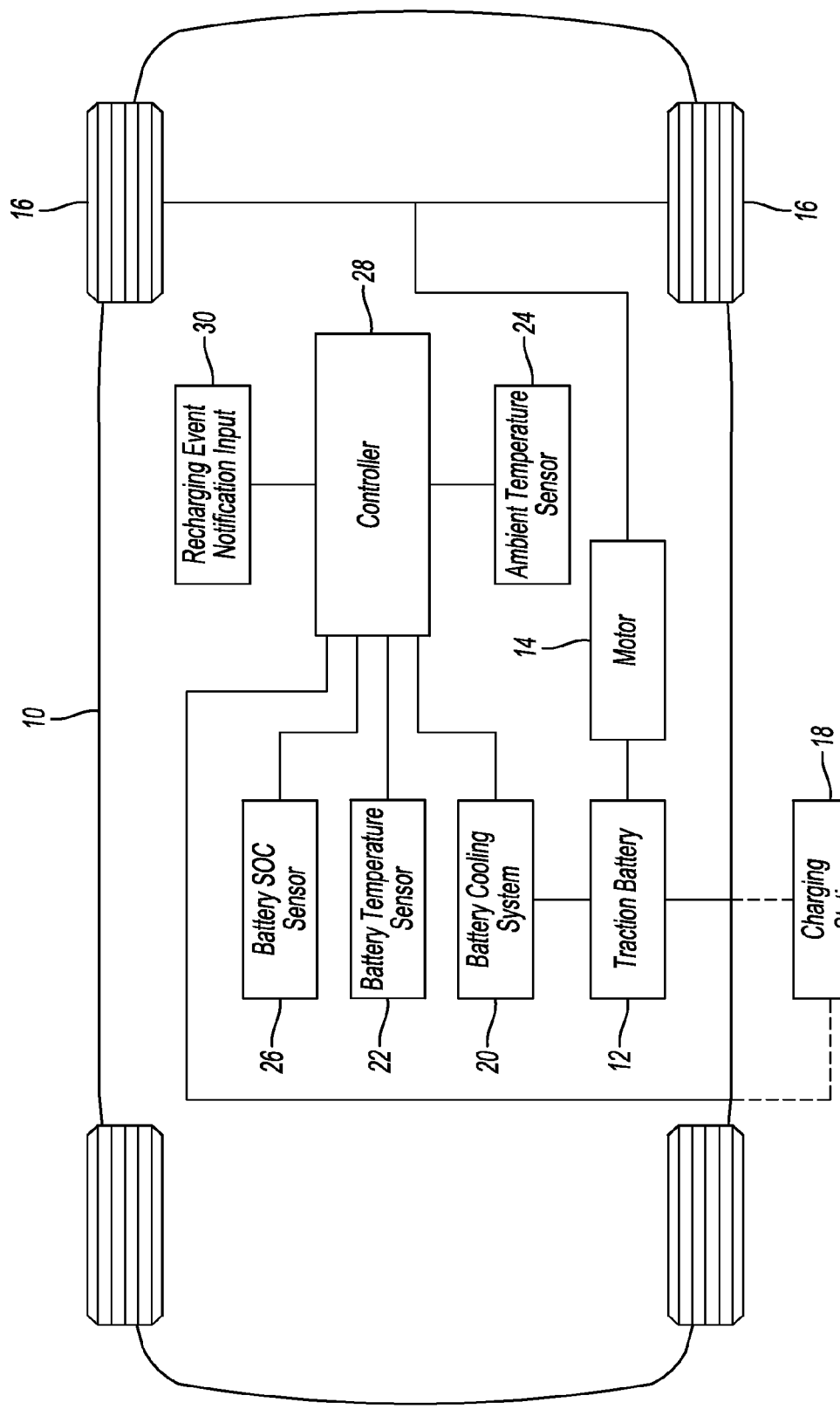
FIG. 1 illustrates a block diagram of an electric vehicle in accordance with an embodiment of the present invention.

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a block diagram of an electric vehicle 10 in accordance with an embodiment of the present invention is shown. In this embodiment, vehicle 10 is a battery electric vehicle (BEV) lacking an internal combustion engine. In other embodiments, vehicle 10 may be a hybrid electric vehicle including an internal combustion engine.

Vehicle 10 includes a traction battery 12 and an electric motor 14. For instance, battery 12 is a lithium-ion battery pack. Motor 14 converts electrical energy from battery 12 into a motor torque for vehicle propulsion. Battery 12 supplies electrical energy to motor 14 through an inverter (not shown) connected between the battery and the motor. Battery 12 discharges to supply the electrical energy to motor 14. Motor 14 provides the motor torque to a vehicle drivetrain to drive one or more wheels 16 of vehicle 10 to propel the vehicle.

Battery 12 is rechargeable with electric energy from the external electric grid at a charging station 18. Charging station 18 provides electrical energy from the electric grid to battery 12 to recharge the battery. Battery 12 is to be recharged after vehicle 10 has been driven for one or more driving events such that the battery has discharged. A recharging event includes the vehicle operator driving vehicle 10 to charging station 18 and parking the vehicle at the charging station. Battery 12 is then plugged into (i.e., coupled to) charging station 12 to be recharged.

In this embodiment, charging station 18 provides relatively high amperage electrical current to battery 12 during the recharging process. For instance, charging station 18 is a "DC fast charge" charging station which uses high voltage (e.g., 400-500V) and high current (e.g., 100-300 A) to charge battery 12. Charging station 18 can charge battery 12 relatively quickly by using the high voltage and high current. DC fast charge is a Level 3 charging process as defined by SAE J1772. In other embodiments, charging station may provide even higher amperage electrical current to charge battery 12. In other embodiments, charging station 18 provides relatively low amperage electrical current to battery 12 during the recharging process. For instance, in these other embodiments, charging station 18 is configured to provide a Level 1 or Level 2 charging process, as defined by SAE J1772.

The temperature of battery 12 should be maintained or kept within a given temperature range while the battery is operating such as during discharging and charging. The temperature range depends on the type and/or characteristics of battery 12. In particular, the temperature of battery 12 should not exceed a maximum operating temperature.

In general, the temperature of battery 12 depends on the ambient temperature (i.e., the temperature of the surroundings of the battery) and the rate at which the battery is being discharged or charged. The following observations can be made with all else being equal. The temperature of battery 12 will be higher with a high ambient temperature (e.g., a hot summer day) than with a low ambient temperature (e.g., a cold winter night). The temperature of battery 12 will be higher when the battery is discharged faster during heavy driving conditions and thereby generates more heat than compared to light driving conditions. The temperature of battery 12 will be higher when the battery is charged by high current, which heats the battery quickly, than when the battery is charged with lower current, which heats the battery slowly.

Vehicle 10 further includes an on-board battery cooling system 20 configured to cool battery 12. Cooling system 20 operates to cool or remove heat from battery 12 to lower or maintain the battery temperature below the maximum temperature. For instance, cooling system 20 delivers a chilled coolant to battery 12 and returns a warmer coolant back to the cooling system. Cooling system 20 may either dissipate the heat through heat exchangers (e.g., a radiator) to the outside environment or to the interior of vehicle 10.

The efficiency of cooling system 20 is most optimal when vehicle 10 is moving. The efficiency is most optimal because of increased airflow through the heat exchangers. Thus, cooling system 20 has more cooling capacity while vehicle 10 is being driven as opposed to while the vehicle is parked at charging station 18. Cooling system 20 may therefore sufficiently cool battery 12 while vehicle 10 is being driven under certain high ambient temperatures whereas the cooling system may lack sufficient cooling capacity to cool the battery while the vehicle is parked at charging station 18 under the same high ambient temperatures.

When cooling system 20 is operated while vehicle 10 is being charged at charging station 18, the cooling system receives electrical energy from the charging station 18 for its operation. On the other hand, when cooling system 20 is operated while vehicle 10 is being driven, battery 12 supplies electrical energy to the cooling system to power the operation of the cooling system. As such, in addition to discharging for vehicle propulsion, battery 12 discharges to power cooling system 20 while vehicle 10 is being driven. This electrical energy discharged from battery 12 for cooling system 20 will therefore be unavailable for vehicle propulsion.

Vehicle 10 further includes a battery temperature sensor 22, an ambient temperature sensor 24, and a battery state-of-charge (SOC) sensor 26. Battery temperature sensor 22 is physically connected to the battery to detect the temperature of the battery. Ambient temperature sensor 24 is configured to detect the temperature of the ambient environment. Battery state-of-charge (SOC) sensor 26 is a processor or the like configured to detect the SOC of the battery. Battery SOC sensor 26 has access to appropriate input information of battery 12 for detecting the battery SOC.

Vehicle 10 further includes a controller 28 in communication with cooling system 20 and sensors 22, 24, and 26. Controller 28 is configured to control cooling system 20 to cool battery 12 to lower or maintain the battery temperature below the maximum temperature. Controller 28 controls cooling system 20 based on the battery temperature, the ambient temperature, the maximum operating temperature, and/or the battery SOC.

Additionally, in accordance with embodiments of the present invention, controller 28 is further configured to control cooling system 20 to pre-cool battery 12, while vehicle 10 is being driven, in anticipation of the battery being recharged at charging station 18. Controller 28 pre-cools battery 12 while vehicle 10 is being driven to take advantage of cooling system 20 having extra cooling capacity due to increased airflow through the heat exchangers. Cooling system 20 may therefore have extra cooling capacity while vehicle 10 is being driven to pre-cool battery 12 even at high ambient temperatures. Controller 28 controls cooling system 20 to pre-cool battery 12 in order to reduce the battery temperature, which should already be below the maximum temperature upon initiation of the pre-cool operation, to be further below the maximum temperature. In effect, the pre-cooling operation is to enlarge the temperature difference between the temperature of battery 12 and the maximum temperature.

Pre-cooling battery 12 to enlarge the temperature difference between the battery temperature and the maximum temperature prior to the recharging process at charging station 18 is desirable. It is desirable because battery 12 heats up during recharging. In particular, battery 12 heats up quickly during a recharging process, such as DC fast charging, which uses relatively high current. This increased amount of heat may be too much for cooling system 20 to dispose of while vehicle 10 is parked at charging station 18 considering that the cooling system does not function as well when the vehicle is parked. Thus, the battery temperature will rise during the recharging even with cooling system 20 operating. If the battery temperature is already near the maximum temperature upon initiation of the recharging process, then the battery temperature will rise and reach the maximum temperature during the recharging process. Separately or in conjunction with the battery temperature being initially near the maximum temperature, if the ambient temperature while vehicle 10 is parked at charging station 18 is relatively high, then the battery temperature will rise and reach the maximum temperature during the recharging process. Hence, the recharging will have to be slowed down (e.g., decrease the amperage of the current from charging station 18) or inhibited (e.g., pause or stop the recharging process) to keep the battery temperature below the maximum temperature.

Pre-cooling battery 12 to enlarge the temperature difference between the battery temperature and the maximum temperature prior to the recharging process causes the battery temperature to not be near the maximum temperature upon initiation of the recharging process. Hence, although the battery temperature may rise during the recharging process despite the operation of cooling system 20, the recharging process should be able to be completed prior to the battery temperature reaching the maximum temperature. As such, the recharging process will not have to be slowed down or inhibited. Further, with a large enough temperature difference between the battery temperature and the maximum temperature at the initiation of the recharging process, cooling system 20 may not be needed to operate at all during the recharging process depending on the ambient temperature conditions and/or the duration and rate of the recharging process.

Cooling system 20 consumes electrical energy from battery 12 for the pre-cool operation to be conducted while vehicle 10 is driven. As such, battery 12 will have less electrical energy to provide for vehicle propulsion. In anticipation of a recharging event at charging station 18, controller 28 is configured to balance (i) the additional electrical energy of battery 12 consumed by cooling system 20 for the pre-cooling operation with (ii) the distance from vehicle 10 to charging station 18 in order to ensure that the vehicle will have the range to reach the charging station. The distance from vehicle 10 to charging station 18 in anticipation of the recharging event at the charging station is distance until charge (DUC) information. As such, in addition to the battery temperature, the ambient temperature, the maximum temperature, and/or the battery SOC, controller 28 is further configured to control cooling system 20 based on DUC information.

Controller 28 is made aware of when a recharging event will commence in order to know when to initiate the pre-cooling operation. That is, controller 28 is made aware of when the vehicle driver decides to drive vehicle 10 to charging station 18 with the intention of recharging battery 12. Controller 28 is also made aware of the distance between vehicle 10 and charging station 18 at the time when the vehicle driver decides to drive the vehicle to the charging station for battery 12 to be recharged. Further, controller 28 may be made aware of the type of charging (e.g. 'fast charging') to be done at charging station 18. Such collective information made aware to controller 28 is designated as "recharging event information."

Vehicle 10 further includes a recharging event notification input 30 for communicating the recharging event information to controller 28. Several methods may be used to communicate the recharging event information to controller 28 and recharging event notification input 30 may take various forms as described below with reference to FIGS. 2A and 2B.

Referring now to FIG. 2A, with continual reference to FIG. 1, a flowchart 40 describing operation of pre-cooling battery 12, while vehicle 10 is being driven, in anticipation of recharging at a charging station in accordance with an embodiment of the present invention is shown. In this embodiment, vehicle 10 is already being driven as indicated in block 42 prior to controller 28 being advised of the recharging event information. In other embodiments, provision of the recharging event information to controller 28 may precede vehicle 10 being driven.

The operation includes an operator (e.g., the vehicle driver) actuating a 'fast charge' button as indicated in block 44 to advise controller 28 that the driver intends to have battery 12 be recharged at a 'fast charge' charging station. As such, controller 28 is made aware that the driver is driving vehicle 10 to a charging station for charging battery 12 and that the charging will be 'fast charge' charging. In this embodiment, recharging event notification input 30 takes the form of the 'fast charge' button.

In conjunction with the driver actuating the 'fast charge' button, the operation further includes the operator manually inputting the distance range between the present location of vehicle 10 and the location of charging station 18 as indicated in block 46. The distance range manually inputted by the driver is the driver's estimate of the actual distance between vehicle 10 and charging station 18. Controller 28 may add extra distance to the manually inputted distance range to accommodate a bad estimation and thereby arrive at a distance between vehicle 10 and charging station 18. In either event, this distance is the distance until charge (DUC).

As described, the process for conveying the recharging event information to controller 28 in this embodiment is a manual process.

The operation further includes controller 28 controlling cooling system 20 to pre-cool battery 12 while vehicle 10 is being driven to charging station 18 as indicated in block 48. In this embodiment, controller 28 pre-cools battery 12 based on the type of recharging to be performed at charging station 18 (in this case, 'fast charging') and the DUC. Controller 28 may pre-cool battery 12 further based on the battery temperature, the ambient temperature, the maximum temperature, and/or the battery SOC.

As a result, battery 12 can be pre-cooled to a cooler battery temperature which thereby allows heat storage capacity of the battery to be used during the recharging process in order to keep the battery temperature below the maximum temperature.

Referring now to FIG. 2B, with continual reference to FIG. 1, a flowchart 50 describing operation of pre-cooling battery 12, while vehicle 10 is being driven, in anticipation of recharging at a charging station in accordance with another embodiment of the present invention is shown. In this embodiment, vehicle 10 is already being driven prior to controller 28 being advised of the recharging event information as indicated by block 52, but the provision of the recharging event information to the controller may precede the vehicle being driven as described above.

The operation includes the driver advising a navigation system of vehicle 10 that the driver intends to have battery 12 be 'fast charged' at a particular charging station, such as charging station 18, as indicated in block 54. As such, controller 28 is made aware that the driver is driving vehicle 10 to a charging station for 'fast charging' battery 12. In this embodiment, recharging event notification input 30 takes the form of the navigation system of vehicle. The driver uses the touch screen of the navigation system to advise controller 28 that the next battery recharging will be a 'fast charge' at the particular charging station 18 which the driver intends to drive vehicle 10 to for recharging the battery. The navigation system calculates the distance between vehicle 10 and charging station 18 (i.e., the DUC) using global position system (GPS) information. As described, the process for conveying the recharging event information to controller 28 in this embodiment is an automatic process based on the navigation system of vehicle 10 and GPS information.

The operation further includes controller 28 controlling cooling system 20 to pre-cool battery 12 while vehicle 10 is being driven to charging station 18 as indicated in block 56. In this embodiment, controller 28 pre-cools battery 12 based on the type of recharging to be performed at charging station 18 (in this case, 'fast charging') and the DUC. Controller 28 may pre-cool battery 12 further based on the battery temperature, the ambient temperature, the maximum temperature, and/or the battery SOC. As a result, battery 12 can be pre-cooled to a cooler battery temperature which thereby allows heat storage capacity of the battery to be used during the recharging process in order to keep the battery temperature below the maximum temperature.

Methods and systems for pre-cooling the traction battery of an electric vehicle, while the vehicle is being driven, in anticipation of battery recharging at a charging station have been described. Providing such pre-cooling may include the following advantages: extended battery life when performing 'fast charging' frequently; reduced time at ('fast charge') charging station; pre-emptive battery cooling enables optimal battery cooling system sizing and may lead to smaller components with lower cost; the vehicle may be able to manage both battery temperature and cabin comfort during ('fast charge') recharging over a wider range of ambient temperatures for a given set of hardware; and when the vehicle is made aware that the next recharging will be a 'slow' charge, the battery temperature can be allowed to increase thereby reducing cooling system energy usage which increases driving range and reduces charging cost.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for an electric vehicle comprising:
receiving an indication that the vehicle is being driven to a charging station; and
commencing operation of a battery cooling system of the vehicle and operating the battery cooling system to pre-cool a traction battery of the vehicle while the vehicle is being driven to the charging station in response to receiving the indication that the vehicle is being driven to the charging station.

2. The method of claim 1 wherein:
operating the battery cooling system to pre-cool the traction battery includes operating the battery cooling system with electrical energy from the traction battery depending on a distance between the vehicle and the charging station at the time of receiving the indication.

3. The method of claim 2 further comprising:
receiving the distance from a vehicle user.

4. The method of claim 2 further comprising:
receiving the distance from a navigation system.

5. The method of claim 1 further comprising:
receiving the indication from a vehicle user.

6. The method of claim 1 further comprising:
receiving the indication from a navigation system.

7. The method of claim 1 wherein:
the vehicle is a plug-in hybrid electric vehicle (PHEV).

8. The method of claim 1 wherein:
the vehicle is a battery electric vehicle (BEV) lacking an internal combustion engine.

9. A system for an electric vehicle comprising:
a battery cooling system configured to cool a traction battery of the vehicle; and
a controller configured to control the battery cooling system to pre-cool the battery upon an indication that the vehicle is being driven to a charging station.

10. The system of claim 9 wherein:
the controller is further configured to control the battery cooling system to pre-cool the battery depending on a distance between the vehicle and the charging station after the indication that the vehicle is being driven to the charging station.

11. The system of claim 10 wherein:
the controller is further configured to receive the distance from at least one of a vehicle user and a navigation system.

12. The system of claim 9 wherein:
the controller is further configured to receive the indication from at least one of a vehicle user and a navigation system.

13. The system of claim 9 wherein:
the controller is further configured to control the battery cooling system to pre-cool the battery depending on a rate of recharging.

14. A battery electric vehicle comprising:
a traction battery;
a battery cooling system to cool the battery; and
a controller to, upon receiving an indication that the vehicle is being driven to a charging station, commence operation of the cooling system and operate the cooling system with electrical energy from the battery depending on a distance between the vehicle and the charging station for the cooling system to cool the battery while the vehicle is being driven to the charging station.

* * * * *